Patented Oct. 16, 1951

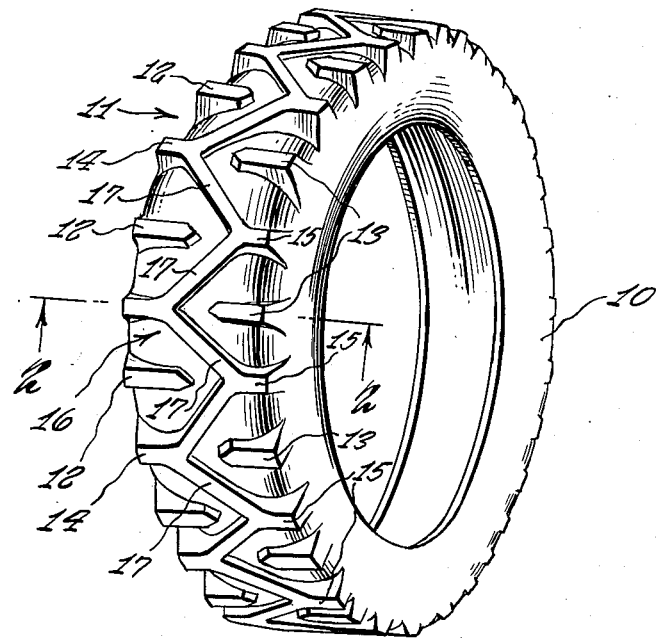
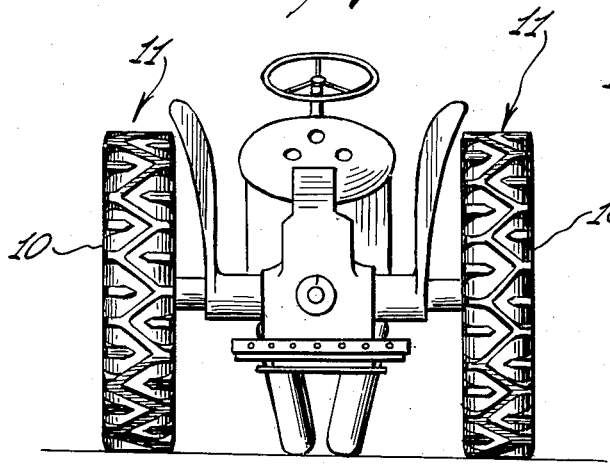

2,571,922

UNITED STATES PATENT OFFICE 2,571,922

TRACTOR TIRES

Harry Floyd Morrison, Moran, Kans.

Application June 3, 1949, Serial No. 96,993

2 Claims. (Cl. 152—209)

This invention relates to tractor tires, and one object is the provision of a two-way tractor tire, that is one which has a tread suitable for exerting proper tractive force on muddy ground in both directions of rotation of the wheels.

A further object of the invention is the provision of a tire having a "flat" non-skid tread thereon, that is having a tread such that the radial distance to the outer surface of the tread, measured on any plane at right angles to the axis of the tire and through the tread, is constant throughout the width of the tread; in other words, the entire outer surface of the tread lies in an imaginary cylinder. Such a tread is desirable in that it provides maximum tractive engagement with all road surfaces apt to be encountered. Moreover, the consequent thinning out of the tread toward the center thereof softens the tire at and toward the center, as a consequence of which it is more yieldable to bumps and stones and thus provides a better shock-absorbing ride for the driver. Further, this tread enables the tire to stand on a level surface unaided.

A still further object of the invention is the provision of a tire tread which will tend to prevent mud from caking between the ridges thereof.

In the case of tractor tires in common use, they are provided with treads which serve to provide suitable traction on such ground only when the wheels rotate in a forward direction, so that the tractor cannot be backed up when stuck in the mud, and in order to back up it would be necessary to jack up the tractor, remove both tires and interchange them on the wheels. This tractor tire tread is moreover bilaterally symmetrical on both sides of a plane passing midway of the width of the tire at right angles to the axis of the tire, so that both sides of the tire are identical This eliminates the common "right" and "left" side of the tire which permits of mounting the tire in only one of the two possible positions on the rim. The tire of this invention, on the other hand, may be mounted with either side of the tire facing outward, and as a result whenever desired and for any purpose, either tire may be removed and simply remounted with the opposite side facing outward. This also results in lengthening the life of the tires.

The above as well as additional objects will become apparent in the following description, wherein characters of reference refer to like-numbered parts in the accompanying drawing. It is to be noted that the drawing is intended solely for the purpose of illustration, and that it is therefore neither desired nor intended to limit the invention necessarily to any or all of the exact details of construction shown except insofar as they may be deemed essential to the invention.

Referring briefly to the drawing,

Fig. 1 is a perspective view of a tractor tire provided with the tread of this invention.

Fig. 2 is a sectional view taken on the line 2—2 of Fig. 1.

Fig. 3 is a rear elevational view of a tractor provided with tires embodying this invention.

Referring in detail to the drawing, the numeral 10 indicates a tractor tire casing having the tread 11. The latter, which of course is molded of rubber, natural or synthetic or partly natural and partly synthetic, comprises, on each side of a median plane through the casing at right angles to the axis, a plurality of circumferentially equidistant ridges 12 on one side of the said plane and a like plurality of like ridges 13 on the other side of said plane.

All of the ridges 12 and 13 lie in radial planes through the axis of the tire, and the ridges 12 are circumferentially staggered with respect to the ridges 13. On each side of the said median plane, additional ridges 14 and 15, also lying in radial planes through the axis, are provided between successive ridges 12 and 13, respectively. It is to be noted that the transverse length of the ridges 14 and 15 is less than that of the ridges 12 and 13, and that the spacing of the ridges 14 and 15 is such that every ridge 14 or 15 on one side of the tire is in the same radial plane with a corresponding ridge 12 or 13 on the other side of the tire.

A continuous zigzag circumferential ridge 16 extends around the tread of the tire and is composed of end-to-end sections 17 which are of course of the same length. Each length 17 is joined at one end to a ridge 15 and at the other end to a ridge 14, and at each ridge 14 or 15 the sections 17 are also joined to each other.

It is apparent that the tire tread illustrated and described provides equal traction grip, as above stated, when rotated in either direction, and also that the tire may be applied on the wheel with either side facing outward.

Obviously, modifications in form or structure may be made without departing from the spirit or scope of the invention.

I claim:

1. A tire having a tread including a zig-zag circumferential ridge, said ridge being composed of a plurality of straight sections of equal length joined end to end, each of said sections successively crossing from one side of the median plane through the tire to the other side thereof, the angle between each of said sections and said median plane being constant, the junctions of said sections on each side of said plane being spaced at equal distances from the corresponding side of the tire, transverse ridges lying in radial planes through the tire extending from said junctions in a direction outward from said median plane to the sides of the tire, and additional transverse ridges of constant length on each side of said zig-zag ridge, said additional ridges on each side of the zig-zag ridge being positioned intermediate said first-named transverse ridges on that side of the zig-zag ridge and extending from the side of the tire in the direction of said median plane but terminating short of and hence spaced from said zig-zag ridge.

2. The tire set forth in claim 1, the outer surfaces of all of said ridges lying in an imaginary cylinder concentric with the axis of the tire.

HARRY FLOYD MORRISON.

REFERENCES CITED

The following references are of record in the file of this patent:

UNITED STATES PATENTS

| Number | Name | Date |
|---|---|---|
| 2,203,617 | Hale | June 4, 1940 |
| 2,271,337 | Hale | Jan. 27, 1942 |